(12) United States Patent
Roossien et al.

(10) Patent No.: US 9,362,747 B2
(45) Date of Patent: Jun. 7, 2016

(54) DISTRIBUTED STATUS CALCULATIONS IN AN ELECTRICITY NETWORK WITH THE AID OF AGENTS

(75) Inventors: Bart Roossien, Alkmaar (NL); Mattheus Petrus Franciscus Hommelberg, Antwerp (BE)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 1025 days.

(21) Appl. No.: 13/515,594

(22) PCT Filed: Dec. 9, 2010

(86) PCT No.: PCT/NL2010/050833
§ 371 (c)(1),
(2), (4) Date: Nov. 2, 2012

(87) PCT Pub. No.: WO2011/074950
PCT Pub. Date: Jun. 23, 2011

(65) Prior Publication Data
US 2013/0054164 A1    Feb. 28, 2013

(30) Foreign Application Priority Data
Dec. 16, 2009 (NL) ...................................... 2003960

(51) Int. Cl.
*H02J 3/00* (2006.01)
*G06F 17/40* (2006.01)
*G06F 19/00* (2011.01)

(52) U.S. Cl.
CPC . *H02J 3/00* (2013.01); *G06F 17/40* (2013.01); *G06F 19/00* (2013.01)

(58) Field of Classification Search
None
See application file for complete search history.

(56) References Cited

U.S. PATENT DOCUMENTS

| | | | |
|---|---|---|---|
| 6,754,597 B2 * | 6/2004 | Bertsch | H02J 3/24 324/521 |
| 7,069,159 B2 | 6/2006 | Zima et al. | |
| 2001/0021896 A1 * | 9/2001 | Bertsch | H02J 3/24 702/62 |

FOREIGN PATENT DOCUMENTS

| | | |
|---|---|---|
| CN | 1427520 A | 7/2003 |
| CN | 1455488 A | 11/2003 |
| JP | 2009100550 A | 5/2009 |

OTHER PUBLICATIONS

Jian Wang et al: "A method of distributed state estimation based on improved innovation graph", Power System Technology and IEEE Power India Conference. 2008. Powercon 2008. Joint International Conference on. IEEE. Piscataway. NJ. USA. Oct. 12, 2008. pp. 1-5. XP031404519. ISBN: 978-1-4244-1763-6 'II. Model of distributed state.

(Continued)

*Primary Examiner* — Edward Cosimano
(74) *Attorney, Agent, or Firm* — Banner & Witcoff, Ltd.

(57) ABSTRACT

Calculating device and method for carrying out status calculations in an electricity network (2) with a multiplicity of nodes (K1-K11). The method comprises the allocation of a local calculating agent (A1-A11) to each of the multiplicity of nodes (K1-K11), the allocation of regional calculating agents (R1, R2) to regional networks (3, 4), the reception by the regional calculating agents (R1, R2) of the results of the status calculations from the associated local calculating agents (A1-A11) and, on the basis thereof, the performance of a status calculation for the associated regional network (3, 4). The method further comprises the creation of a simplified network representation of the associated regional network (3, 4) and the reception by a higher-order regional calculating agent (R3) of the results of the status calculations and the simplified network representations of the regional calculating agents (R1, R2), and, on the basis of the simplified network representations, calculation of the status of the electricity network (2).

12 Claims, 2 Drawing Sheets

(56) References Cited

OTHER PUBLICATIONS

Zhang Haibo et al: "A new distributed power flow algorithm between multi-control-centers based on asynchronous iteration", Power System Technology. 2006. Powercon 2006. International Conference on. IEEE. Pl, Oct. 1, 2006. pp. 1-7, XP031053323. ISBN: 978-1-4244-0110-9 paragraph [OOIV].

Baalbergen F et al: "Modern state estimation methods in power systems", Power Systems Conference and Exposition. 2009. PES '09. IEEE/PES. IEEE. Piscataway, NJ. USA. Mar. 15, 2009. pp. 1-6, XP031450570, ISBN: 978-1-4244-3810-5 "B. Agent-Based Distributed State Estimation".

Gamm A Z et al: "Decomposition algorithm for power system state estimation by the test equation technique and its implementation on the basis of multi-agent approach", Powertech. 2009 IEEE Bucharest, IEEE, Piscataway, NJ, USA, Jun. 28, 2009. pp. 1-7. XP031543400, ISBN: 978-1-4244-2234-0 p. 4.

International Search report—PCT/NL20101050833—Date of mailing: Jan. 27, 2012.

Guo, Hongxia, et al., Voltage and reactive power coordinated control system of hierarchical and distributed structure based on multi-agent system, Power System Technology, vol. 31, No. 2, pp. 16-21, Jan. 31, 2007.

"Distributed agent-based state estimation for electrical distribution networks" (M. Nordman and M. Lehtonen), IEEE Transactions on Power Systems, vol. 20, No. 2, May 2005.

"Distributed power flow calculation for whole networks including transmission and distribution", (H. Sun and B. Zhang), IEEE Xplore, 2008.

"A distributed method for solving nonlinear equations applying the power load flow calculation", (M. Osano and M. Capretz), Proceedings of the Thirtieth Annual Hawaii International Conference on System Sciences, ISBN 0/8186-7862-3/97, IEEE 1997.

"Distributed fast decoupled load flow analysis", (K. Dasgupta and K. Swarup), IEEE Xplore, 2008.

Powell, Lynn. Power system load flow analysis. McGraw-Hill, 2005.

\* cited by examiner

DISTRIBUTED STATUS CALCULATIONS IN AN ELECTRICITY NETWORK WITH THE AID OF AGENTS

CROSS-REFERENCE TO RELATED APPLICATIONS

This application is a U.S. National Stage application under 35 U.S.C. §371 of International Application PCT/NL2010/050833 (published as WO 2011/074950 A2), filed Dec. 9, 2010 which claims priority to Application NL 2003960, filed Dec. 16, 2009. Benefit of the filing date of each of these prior applications is hereby claimed. Each of these prior applications is hereby incorporated by reference in its entirety.

FIELD OF THE INVENTION

The present invention relates to a method and calculating device for carrying out status calculations (power flow or load flow calculations) in an electricity network with a multiplicity of nodes (buses).

PRIOR ART

The article entitled 'Distributed Agent-Based State Estimation for Electrical Distribution Networks' by M. M. Nordman and M. Lehtonen, IEEE Transactions on Power Systems, Vol. 20, no. 2, May 2005, p. 652-658, discloses a method for estimating a status in electrical distribution networks. From a central perspective (a primary substation), the status of a network of secondary substations is calculated on the basis of a 'token' forwarding mechanism. The primary substation periodically initiates a token and forwards this to the closest secondary substation. A tree structure is passed through over all secondary substations, wherein the topology of the network is also supplied to the token. Local data are added in each case to the token for a (central) observability analysis. A status estimation is then made for the whole network on the basis of centrally and locally available data. The locally available data are again collected by sending a token around in the tree structure and by adding local data to the token. This article relates to 'State Estimation', of which power flow calculations form a part.

A different technique for status calculations is disclosed in the article by H. Sun entitled 'Distributed power flow calculation for whole networks including transmission and distribution', IEEE/PES transmission and distribution conference, Apr. 21-24, 2008. In this article, a master-slave split method is applied in which the transmission network and the distribution network are calculated in turn.

In the article by B. Stott et al. entitled 'Fast Decoupled Load Flow', IEEE Transactions on Power Apparatus Systems, Issue 3 (May), 1974 the Newton-Raphson method is used to solve the set of non-linear equations at a central point, wherein the calculation process is speeded up by dividing the matrix into two parts.

SUMMARY OF THE INVENTION

The present invention seeks to provide a method and calculating device which can carry out status calculations in an electricity network in a more efficient manner.

According to the present invention, a method is provided for carrying out status calculations in an electricity network with a multiplicity of nodes, wherein a node has an associated status which comprises a complex voltage, an incoming and outgoing (active and reactive) power, wherein the method comprises:

the allocation of a local calculating agent to each of the multiplicity of nodes, wherein the local calculating agent carries out status calculations exclusively of the associated node;

the allocation of regional calculating agents to regional networks, wherein each regional network comprises a part of the multiplicity of nodes, and the total of regional networks forms the electricity network with the exception of interregional connections between nodes;

the reception by the regional calculating agents of the results of the status calculations of the associated local calculating agents (i.e. external variables only), and, on the basis thereof, the performance of a status calculation for the associated regional network (without incorporating the influence of a different regional network), and the creation of a simplified network representation of the associated regional network; and the reception by a higher-order regional calculating agent of the results of the status calculations and the simplified network representations of the regional calculating agents, and, on the basis of the simplified network representations, calculation of the status of the electricity network, wherein the interregional connections are included in the calculation.

A layered model of this type with separate calculating agents requires less data exchange between the different layers. This also opens up the possibility of an increased efficiency in the performance of the different calculations, for example with parallel calculations. The agent may, for example, be implemented as a (software) entity with input and output and with a defined purpose. An agent looks after the interests of a user, a component or entity in embodiments of the present method. The regional networks and the associated regional calculating agents may also be layered together, as a result of which a network structure is created with an in fact unlimited number of layers. A model of this type can also be referred to as a "multi-agent system", i.e. a system with more than one agent, wherein agents can or must negotiate or collaborate with one another.

In one embodiment, the method further comprises
the sending of the results of the status calculation of the electricity network by the higher-order regional calculating agent to the regional calculating agents;
the carrying out once more of status calculations by the regional calculating agents; and
the sending by the regional calculating agent of the results of the status calculation to the local agents. Through the feedback of calculating results to lower-positioned calculating agents, initial estimations of defined data can be replaced by calculated data, and a new iteration can be started.

In a further embodiment, the method further comprises the iterative performance of status calculations by the local calculating agents, the regional calculating agents, and the higher-order regional calculating agent. The iterative approach to a solution of the different status calculations (non-linear equations) will result in a better and faster solution, i.e. with a lower error margin.

In a further embodiment, the status calculations by two or more of the local calculating agents, regional calculating agents and the higher-order regional calculating agent are carried out in parallel. This delivers a saving on the time required to carry out status calculations.

In a further embodiment, one or more of the local calculating agents, regional calculating agents and the higher-order regional calculating agent are implemented as an autonomous unit. The agent is then an autonomous unit which is autonomously capable of carrying out calculations locally, independently from the other agents in the same or in a different layer in the electricity network.

In a further embodiment, the method comprises the simultaneous sending of the calculated status by the regional calculating agent to the higher-order regional calculating agent and to the associated local agents. This ensures an even more direct iteration, as a result of which, in certain circumstances, a convergence of the solution of the status calculations is obtained more quickly.

In a further embodiment, the higher-order regional calculating agent periodically carries out the status calculation. This results in a predictable behaviour of the method, which may be advantageous if the results of the status calculations are further used in other measurements or simulations.

In a further embodiment, the higher-order regional calculating agent carries out the status calculation after receiving results from each of the regional calculating agents. In this embodiment, a predictable result is thus also achieved, but an asynchronous reception of results of status calculations is possible, whereby all data necessary for a new status calculation are first collected.

In a further aspect, the present invention relates to a computer program product on which instructions executable by a computer are stored, which, as soon as they are loaded onto a computer system, provide the computer system with the functionality of the method according to one of the present embodiments, as described above.

In another further aspect, the present invention relates to a calculating device to carry out status calculations on an electricity network, wherein the calculating device comprises one or more computer systems, and the one or more computer systems are designed to implement one or more of a local calculating agent, regional calculating agents and a higher-order regional calculating agent, as a result of which the calculating device obtains the functionality of the method according to one of the present embodiments, as described above. A calculating device of this type can, for example, be used advantageously by a network manager, both to monitor an electricity network and to perform simulations of an electricity network.

In one embodiment, the calculating device is further provided with an interface to receive measurement data from sensors. Up-to-date measurement data can thus be included in the calculations. In a further embodiment, the calculating device is a part of a node in the electricity network, for example in the form of an embedded system.

BRIEF DESCRIPTION OF THE DRAWINGS

The present invention will now be discussed in more detail on the basis of a number of example embodiments, with reference to the attached drawings, in which.

DETAILED DESCRIPTION OF EXAMPLE EMBODIMENTS

Figure 1:
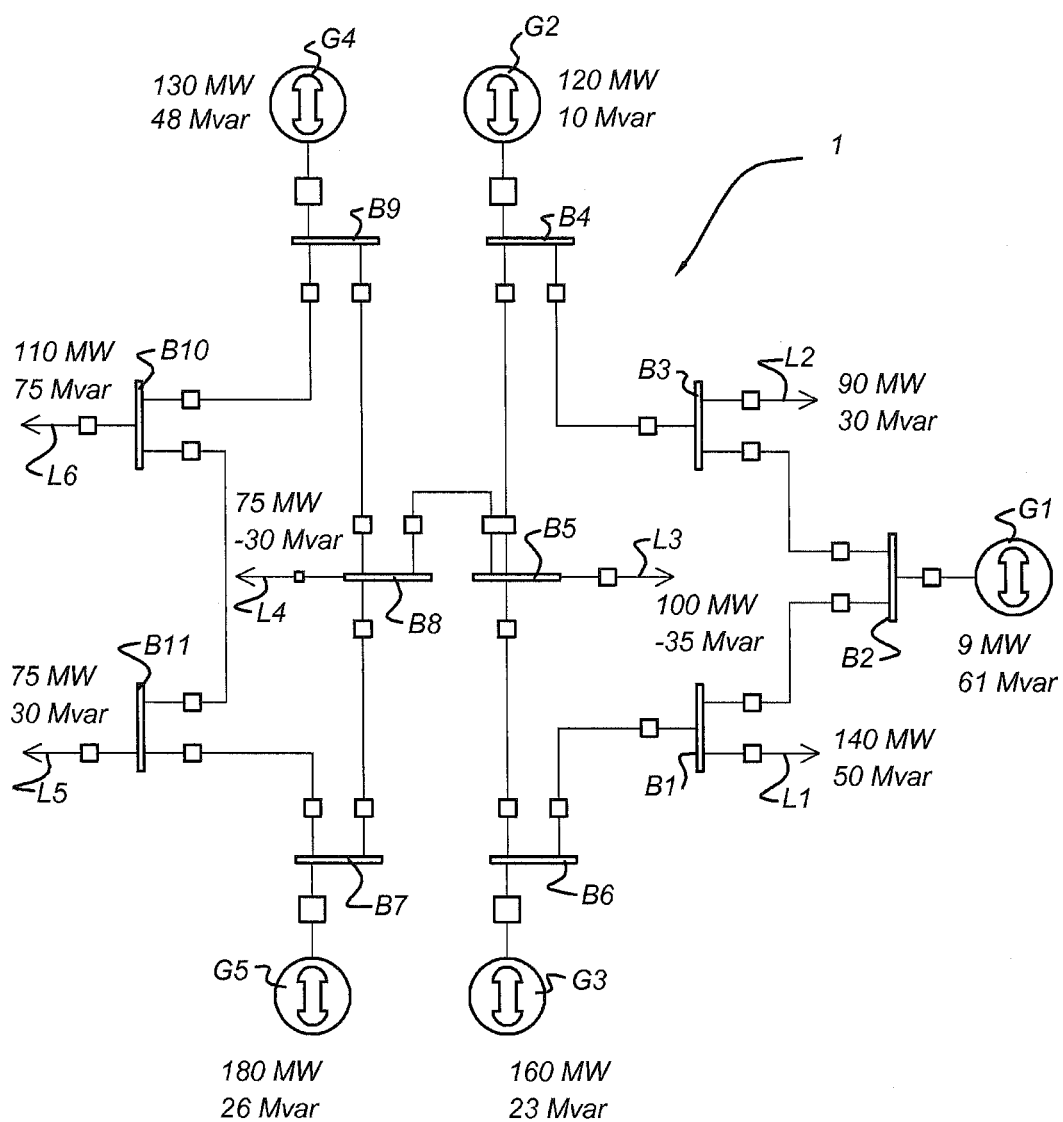
FIG. 1 shows a schematic example of a (small) electricity network, in which the present invention can be applied.

Status calculations on electricity networks are an important resource in the design, planning, and operation of electricity networks. The status calculations are also referred to in the relevant technical field as power flow or load flow calculations. In the status calculations, (complex) voltages are calculated on node points in the network, after which the (active and reactive) power flows through cables and lines can be calculated. The status calculations often comprise numerical analytical methods to solve or to calculate the non-linear equations. An example of an electricity network 1 of this type is shown in FIG. 1. In the technical field, it is generally assumed that the complexity of power flow calculations increases by the third power of the number of nodes K1-K11.

Due to the complexity of the aforementioned status calculations, the size of an electricity network 1 (i.e. the number of nodes) to be calculated is usually limited, as is the speed with which this can be done. Conventional status calculations (power flow calculations) are based on a central calculating method, for example with the aid of Newton-Raphson equations. Here, a set of non-linear equations are solved at a central point with the aid of matrices. With these methods from the prior art, it is often impossible to divide calculations into different parts that can be carried out independently from one another, and improvements in the speed of calculations and the scope of calculations are difficult to implement.

FIG. 1 shows in schematic form eleven nodes (or buses) B1-B11 in an electricity network 1. Each node B1-B11 is connected to one or more other nodes B1-B11, receives power from zero, one or more generators G1-G5, and delivers power to zero, one or more loads L1-L6.

In the example shown, the first node B1 is connected to a first load L1, which, in the example shown, takes up 140 MW of active and 50 MVAR of reactive power. The first node B1 is further connected to nodes B2 and B6. The second node B2 receives 9 MW of active and 61 MVAR of reactive power from the generator G2 and is further connected to the node B3. The remaining nodes B4-B11 are connected to other elements as indicated in FIG. 1.

Each node B1-B11 or bus has an associated status in the electricity network 1, comprising a complex voltage, an incoming and outgoing (active and reactive) power.

The indicated active and reactive powers can be actual, up-to-date measurement data originating from the respective generators G1-G5, loads L1-L6 and nodes B1-B11, with measurement devices known to the person skilled in the art. As an alternative, the numbers can also be simulated data, and, for example, one or more of the aforementioned numbers can be definable as parameters, after which the other shown data are calculated and displayed.

Thus, it is possible for a network manager to determine how thick cables and/or lines must be designed and, for example, to observe the behaviour of the network (simulation) if one or more of the generators G1-G5, loads L1-L6 or cables fail.

Power flow or status calculations can also be used to optimise the network management, for example by reducing losses in the network, as a result of which operating costs can be reduced.

According to the present invention, the power flow or status calculations are carried out in a distributed manner, for example with the aid of local pieces of software (agents) which can carry out power flow calculations at a local level (i.e. for each node B1-B11).

Figure 2:
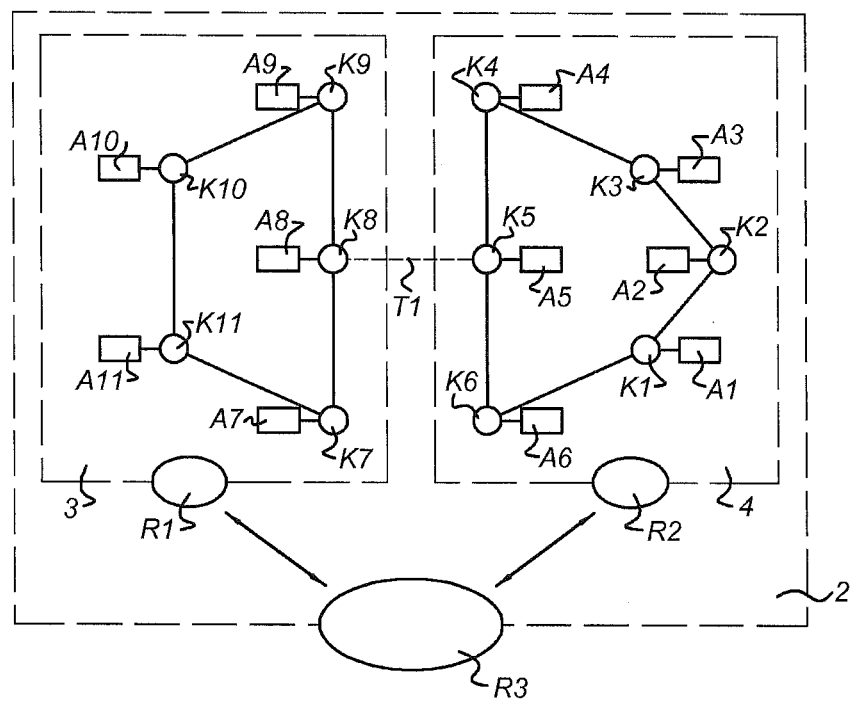
FIG. 2 shows a schematic representation of an implementation of an embodiment of the method according to the present invention applied to the electricity network shown in FIG. 1.

In FIG. 2, an implementation of an embodiment of the method according to the present invention is applied to the electricity network shown in FIG. 1. The electricity network 2 shown in FIG. 2 comprises 11 nodes K1-K11. Each of the nodes K1-K11 can have a configuration such as one of the nodes B1-B11 of the example as discussed with reference to FIG. 1, i.e. a generator G1-G5, load L1-L6 and/or other nodes can be connected to each node K1-K11. The nodes K1-K6 (with their interconnections) form a first region or regional network 4, and the nodes K7-K11 form a second region or regional network 3. An interregional connection T1, which interconnects the first and second region 3, 4 to constitute the entire presented electricity network 2, is located between the nodes K5 and K8.

An agent A1-A11 (local calculating agent), which in each case has all local information (measurement or simulation data associated with the respective node K1-K11) is associated with each node K1-K11. This contrasts with hitherto known methods, wherein all required information must be available centrally in the electricity network 1. Each agent A1-A11 represents the status of exclusively the associated node K1-K11, i.e. can calculate the status of the relevant node K1-K11 on the basis of data (estimates or measurement data). The status comprises (just as in conventional power flow calculations) the (complex) voltage on the node K1-K11, and the incoming or outgoing (complex) power. In each node K1-K11, some parameters can be known, whereas the remaining parameters are initially estimated, and finally calculated.

For each region 3, 4 a regional calculating agent R1, R2 is present or allocated. Each regional network 3, 4 comprises a part of the multiplicity of nodes K1-K11, and the total of regional networks 3, 4 forms the electricity network 2 with the exception of the interregional connection T1 (between nodes K5-K8 in the example shown). The regional calculating agent R1, R2 receives the relevant data, i.e. the results of the status calculations, from the agent A1-A11 associated with the nodes K1-K11 from the relevant region 3, 4. The regional calculating agent R1, R2 then carries out a power flow calculation known per se for the region 3, 4 which is limited in extent, but without taking into account the dynamic influence of the one region 3 or the other region 4 (by means of the interregional connection T1: these are not taken into consideration, and are only incorporated as boundary conditions).

Each regional calculating agent R1, R2 also carries out a simplification of the respective regional network 3, 4 and stores this as a simplified network representation of the associated regional network 3, 4, for example even to the level of one single node, or a combination of several nodes (fewer than the total number of nodes in the relevant regional network 3, 4). These data (simplified network topology) are also forwarded to a higher level.

In this example, the regional networks 3 and 4, in combination with the interregional connection T1, form the entire electricity network 2. It is of course possible for the electricity network 2 to comprise more regions 3, 4, which are interconnected in a more or less complex manner with one or more interregional connections.

A higher-positioned calculating agent R3 (or higher-order regional calculating agent) is associated with the entire electricity network 2, and receives the information from the lower-positioned regional calculating agents R1, R2, not directly from the calculating agents A1-A11 in each region 3, 4. The data relating to the simplified regional networks and the associated measurement or simulation data are received by the higher-positioned calculating agent R3 from the regional calculating agents R1, R2. As a result, the higher-positioned calculating agent R3 can model a substantially simplified network from the electricity network 2 (including the interregional connection T1), and, with all collected data, can calculate the entire electricity network 2 with power flow calculations quickly and in a less complex manner.

After the calculations have been carried out by the higher-positioned calculating agent R3, the information obtained (which comprises, inter alia, the link between the regions 3, 4) is shared with or forwarded to the lower-positioned regional calculating agents R1, R2, in so far as this information is relevant to the associated region 3, 4. The data obtained are in turn re-used by the regional calculating agents R1, R2 in order to carry out the status calculations at local level. The data thus obtained are again shared with or forwarded to the local agents A1-A11, which can then again carry out a renewed power flow calculation at local level.

In a further embodiment, the entire process is iterative, in order to arrive at a stable solution for the status of the entire network 2. The number of layers may be greater than the three layers shown in this example (local agents A1-A11; regional calculating agents R1, R2 and higher-order regional calculating agent R3). As a result, it is possible to carry out status calculations (power flow) for even more complex electricity networks, with still limited means for carrying out the calculations. An optimisation of the size of each region 3, 4 can be carried out on the basis of, for example, the available calculating resources.

The iterations can be carried out from the layer of local agents A1-A11 via the regional calculating agents R1, R2 to the higher-order regional calculating agent R3, and back again. As an alternative, in a further embodiment, the calculated status is sent simultaneously by the regional calculating agent R1, R2 to the higher-order regional calculating agent R3 and to the associated local agents A1-A11. In specific circumstances, this can result in a faster convergence of the iteration steps.

In a further embodiment of the present invention, the higher-order regional calculating agent R3 periodically carries out the status calculation. This provides a readily predictable behaviour of the present method. As an alternative, the higher-order regional calculating agent R3 carries out the status calculation after receiving results from each of the regional calculating agents. This enables the asynchronous performance of the sub-steps of the present method in the lower layers, whereby in total as few iterations as possible have to be carried out.

In one embodiment, the agents A1-A11 and regional calculating agents R1, R2, R3 are implemented as software (modules, programs) which is executed on a computer system 25. A computer system 25 of this type is shown (in simplified form) in FIG. 3. The computer system 25 comprises a processor (PROC) 20, and a memory unit (mem) 21 (such as a hard disk and/or semiconductor memory) connected to the processor 20 and an input/output unit (I/O) 22. The input/output unit (I/O) 22 is connected to various peripheral devices 23.

An example of a peripheral device 23 is a read unit to read computer-executable instructions into the memory 21. The read unit can be designed to read data (such as computer-executable instructions) from and possibly store data on a computer program product, such as a floppy disk or CD-ROM. Other comparable data media may be, for example, memory sticks, DVDs or Blu-ray discs, as known to the person skilled in the art.

The processor 20 in the computer system 25 may be implemented as a stand-alone system or as a number of parallel-operating processors, each one being designed to execute subroutines of a larger program, or as one or more main processors with various subprocessors.

In one embodiment, the various local agents A1-A11 and regional calculating agents R1, R2, R3 are implemented on one central computer system 25. This can, for example, be applied if the power flow calculations are carried out as a simulation of an existing or future electricity network 2.

As an alternative, the agents A1-A11 and calculating agents R1, R2, R3 can be implemented on a plurality of computer systems 25 (decentralised), for example in the case where up-to-date measurement values from an electricity network 2 are used (with the use of sensors 23). In one embodiment, the input/output unit 22 is an interface 22 for the exchange of data with one or more sensors 23 (as a further example of the peripheral devices 23 which are to be connected to the input/output unit 22). The sensors 23 measure voltage, current and/or other operational parameters associated with a node K1-K11. These measurement data can be used in the embodiments described herein.

Decentralised processing (for example via a computer network) can also be used in simulations of electricity networks.

As a further alternative, calculations are carried out in parallel by two or more of the local calculating agents, regional calculating agents and the higher-order regional calculating agent, for example on a computer system 25 that is suitable for parallel execution of software. This results in a time gain, through the distribution of intrinsically complex calculations among a plurality of (physical or virtual) processors 20.

In all of the embodiments quoted as examples, one or more of the local calculating agents A1-A11, regional calculating agents R1, R2 and the higher-order regional calculating agent R3 can be implemented as an autonomous unit. An autonomous unit of this type is autonomously capable of carrying out local calculations, independently from other agents in the same or a different layer.

Figure 3:
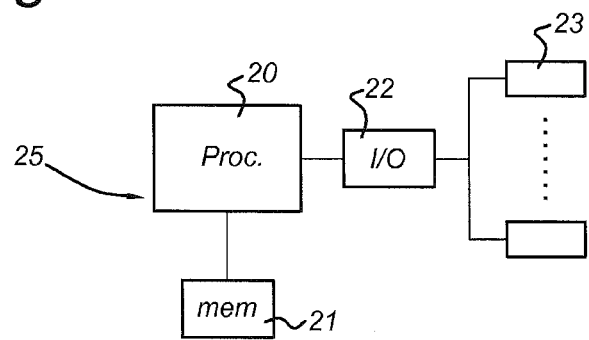
FIG. 3 shows a schematic representation of a computer system on which (parts of) the present method can be implemented.

In another further embodiment, the invention is implemented as a calculating device. The calculating device comprises one or more computer systems 25 as shown in FIG. 3. The one or more computer systems 25 are designed to implement one or more of the local calculating agent A1-A11, and regional calculating agents R1, R2, R3, for example in the form of software modules. The calculating device is designed, for example with the aid of software programs, to implement one of the embodiments described above.

The calculating device as described with reference to various embodiments may be a part of a node K1-K11 in the electricity network 2, and may, for example, be implemented as an embedded system.

The present invention has been described in detail above with reference to embodiments and examples. It will be clear to the person skilled in the art that various parts of the discussed embodiments can be implemented in a different way, while still achieving the same result. The scope of protection of the present application is then also determined by the elements and equivalents thereof defined in the claims.

What is claimed is:

1. Method for carrying out status calculations in an electricity network with a multiplicity of nodes, wherein a node has an associated status which comprises a complex voltage, an incoming and an outgoing power, wherein the method comprises:
    the allocation of a local calculating agent to each of the multiplicity of nodes, wherein the local calculating agent carries out status calculations exclusively of the associated node;
    the allocation of regional calculating agents to regional networks, wherein each regional network comprises a part of the multiplicity of nodes and the total of regional networks forms the electricity network with the exception of interregional connections between regional networks;
    the reception by the regional calculating agents of the results of the status calculations of the associated local calculating agents, and, on the basis thereof, the performance of a status calculation for the associated regional network, and the creation of a simplified network representation of the associated regional network; and
    the reception by a higher-order regional calculating agent of the results of the status calculations and the simplified network representations of the regional calculating agents, and, on the basis of the simplified network representations, calculation of the status of the electricity network.

2. Method according to claim 1, further comprising
    the sending of the results of the status calculation of the electricity network by the higher-order regional calculating agent to the regional calculating agents;
    the carrying out once more of status calculations by the regional calculating agents; and
    the sending by the regional calculating agent of the results of the status calculation to the local agents.

3. Method according to claim 1, further comprising
    the iterative performance of status calculations by the local calculating agents, the regional calculating agents, and the higher-order regional calculating agent.

4. Method according to claim 1, wherein status calculations are carried out in parallel by two or more of the local calculating agents, regional calculating agents and the higher-order regional calculating agent.

5. Method according to claim 1, wherein one or more of the local calculating agents, regional calculating agents and the higher-order regional calculating agent are implemented as an autonomous unit.

6. Method according to claim 1, further comprising
    the simultaneous sending of the calculated status by the regional calculating agent to the higher-order regional calculating agent and to the associated local agents.

7. Method according to claim 1, wherein the higher-order regional calculating agent periodically carries out the status calculation.

8. Method according to claim 1, wherein the higher-order regional calculating agent carries out the status calculation after receiving results from each of the regional calculating agents.

9. A non-transitory computer readable medium having a computer program embodied thereon, the computer program including instructions for causing a programmable processor to perform
    the allocation of a local calculating agent to each of the multiplicity of nodes, wherein the local calculating agent carries out status calculations exclusively of the associated node;
    the allocation of regional calculating agents to regional networks, wherein each regional network comprises a part of the multiplicity of nodes and the total of regional networks forms the electricity network with the exception of interregional connections between regional networks;
    the reception by the regional calculating agents of the results of the status calculations of the associated local calculating agents, and, on the basis thereof, the performance of a status calculation for the associated regional network, and the creation of a simplified network representation of the associated regional network; and
    the reception by a higher-order regional calculating agent of the results of the status calculations and the simplified network representations of the regional calculating agents, and, on the basis of the simplified network representations, calculation of the status of the electricity network.

10. Calculating device for carrying out status calculations on an electricity network, wherein the calculating device comprises one or more computer systems, and the one or more computer systems are designed to implement one or more of a local calculating agent, regional calculating agents and a higher-order regional calculating agent, as a result of which the calculating device obtains the functionality to perform the allocation of a local calculating agent to each of the multiplicity of nodes, wherein the local calculating agent carries out status calculations exclusively of the associated node;

the allocation of regional calculating agents to regional networks, wherein each regional network comprises a part of the multiplicity of nodes and the total of regional networks forms the electricity network with the exception of interregional connections between regional networks;

the reception by the regional calculating agents of the results of the status calculations of the associated local calculating agents, and, on the basis thereof, the performance of a status calculation for the associated regional network, and the creation of a simplified network representation of the associated regional network; and the reception by a higher-order regional calculating agent of the results of the status calculations and the simplified network representations of the regional calculating agents, and, on the basis of the simplified network representations, calculation of the status of the electricity network.

11. Calculating device according to claim 10, further provided with an interface to receive measurement data from sensors.

12. Calculating device according to claim 10, wherein the calculating device is a part of a node in the electricity network.

* * * * *